United States Patent [19]
Wasp

[11] 3,996,058
[45] Dec. 7, 1976

[54] INHIBITION OF CORROSION IN A PIPELINE CARRYING A SLURRY

[75] Inventor: Edward J. Wasp, San Rafael, Calif.

[73] Assignee: Bechtel International Corporation, San Francisco, Calif.

[22] Filed: July 28, 1975

[21] Appl. No.: 599,708

Related U.S. Application Data

[63] Continuation-in-part of Ser. No. 487,964, July 12, 1974, abandoned, which is a continuation of Ser. No. 341,164, March 14, 1973, abandoned, which is a continuation-in-part of Ser. No. 110,556, Jan. 28, 1971, abandoned.

[52] U.S. Cl. .............................. 106/14; 21/2.7 R; 252/387
[51] Int. Cl.² ...................................... C23F 11/08
[58] Field of Search ................... 106/14; 21/2.7 R; 252/387

[56] References Cited
UNITED STATES PATENTS

| | | | |
|---|---|---|---|
| 2,064,325 | 12/1936 | Sutton et al. | 106/14 |
| 2,129,459 | 9/1938 | Benoit | 106/14 |
| 2,169,584 | 8/1939 | Kelley | 106/14 |
| 3,865,547 | 2/1975 | Titus et al. | 21/2.7 R |

Primary Examiner—Lorenzo B. Hayes

[57] ABSTRACT

The method of inhibiting corrosion in a steel pipeline by a slurry comprising water as the vehicle for carrying a comminuted material which is reactive with oxygen, as for example, coal. Inhibition of corrosion is obtained by the addition to the slurry of pellets containing hexavalent chromate, which is released into the slurry in a controlled amount sufficient to inhibit corrosion but wherein the concentration of chromate is not so great that excessive amounts thereof are consumed by the slurry material.

2 Claims, 2 Drawing Figures

INVENTOR
EDWARD J. WASP

INHIBITION OF CORROSION IN A PIPELINE CARRYING A SLURRY

BACKGROUND OF THE INVENTION

This application is a continuation-in-part application of Application Serial No. 487,964, filed July 12, 1974, which is, in turn, a continuation application of Serial No. 341,164, filed March 14, 1973, which is, in turn, a continuation-in-part of my application Serial No. 110,556, filed January 28, 1971, all now abandoned.

The present invention relates to the inhibition of corrosion of a steel pipeline by a slurry comprising water as the vehicle for carrying a comminuted material which is reactive with oxygen, such as, for example, coal. Other such materials are limestone and other cement raw materials, iron concentrates, gilsonite, phosphate rock, various mineral tailings, kaolin, copper concentrates, sewage sludge, potash (although water soluble, can be transported as a slurry when above the saturation concentration), lead-zinc concentrates, nickel concentrates, pyrite, coke, wood chips, magnetite ore, copper ore, and hematite ore. The above list is not exclusive for most freshly comminuted materials, for example, have a reducing property on their new surfaces. For example, all sulfides including chalcopyrite, iron pyrites, and lead-zinc sulfides react with oxygen to form the sulfates. In the case of magnetite, the $Fe_3O_4$ is oxidized to $Fe_2O_3$; $4Fe_3O_4 + O_2 \rightarrow 6 Fe_2O_3$.

Inhibition of corrosion of a steel pipeline carrying a material as above is obtained by the addition to the slurry of pellets containing hexavalent chromate, which is released into the slurry in a controlled amount sufficient to inhibit corrosion but wherein the concentration of chromate is not so great that excessive amounts thereof are consumed by the slurry material.

The invention will be particularly described as applied to the transport of a coal slurry, in which corrosion of the steel pipeline is inhibited by the slow release of hexavalent chromate to maintain a relatively constant concentration in the environment in which the chromate is present as an inhibitor to protect against metal loss. The rate of chromate consumption by the coal is directly proportional to the chromate concentration in solution. Thus, the higher the chromate concentration, the higher is the rate of chromate consumption. In accordance with this invention, the chromate is provided in such form that it is released slowly and at a rate sufficient to provide corrosion protection during the period of coal transportation, yet below a high concentration whereat the chromate is consumed at an excessive rate.

In the prior art, chromate has been added to slurries to inhibit corrosion, but the chromate has been added in large quantities, thought to be necessary to overcome the consumption thereof by the slurry material. Accordingly, not only has the effectiveness of prior art methods been less than desired, and of short duration, but also wasteful and expensive.

SUMMARY OF THE INVENTION

The use of chromate as a corrosion control media in a 10 inch steel pipeline which extends 108 miles from Cadiz, Ohio to the Eastlake plant of the Electric Illuminating Company, located 20 miles east of Cleveland on the shores of Lake Erie, is discussed in "Materials Protection," Volume 2, page 26 et seq. The slurry transported consists of coal of 14 mesh by 0 size grind at 50% concentration prepared by rod mills and crushers. In the course of the study of corrosion in that pipeline, it was discovered that basically two corrosion mechanisms are present. One, referred to as initial corrosion, is the result of dissolved oxygen. It is the more severe and can lead to serious pipe damage unless controlled. The other, or residual corrosion, occurs throughout the line even after oxygen is depleted and is attributed to various constituents in the coal. It is generally of a less severe nature and is of less concern. Both types of corrosion can be maintained at a level less than three mils per year with addition of sufficient inhibitor.

As noted previously herein, chromate salts are commonly used to inhibit the effects of corrosive attack on the inner wall of pipelines used to transport coal slurries. The chromate salts, usually either sodium chromate or sodium dichromate, are normally added to the coal slurry system in the form of a water-based solution. In this regard, the following facts have been found:

1. The chromium ion, $Cr^{+6}$, in addition to being taken up by the steel pipe, is consumed in significant quantities by the coal itself. This consumption of chromate by coal renders a portion of the inhibitor useless for corrosion control.

2. The rate of consumption of chromate by coal is directly proportional to the concentration of chromate dissolved in solution. Thus, the higher the chromate concentration, the higher is the rate of consumption of chromate.

3. The principal agent of corrosion in coal slurry pipelines is dissolved oxygen which is depleted according to a first order reaction in a coal slurry environment. However, the rate at which the oxygen is depleted is dependent upon the concentration of chromate in the system. Thus, for a high chromate concentration, the oxygen is depleted slowly, while for a low chromate concentration, the oxygen is depleted rapidly.

4. Once the oxygen is fully depleted, a chromate concentration of only 1–2 parts per million (calculated on the water phase) is required to maintain adequate corrosion protection.

In accordance with this invention, it is proposed that the chromate be added to the pipeline in such a form as to retard its release to the system, thus ensuring the presence of only a low concentration of chromate at ony one time. It is intended in this manner to:

1. Extend the effective life of a given quantity of chromate by reducing the rate at which chromate is taken up by coal.
2. Reduce the length of the initial high oxygen period during which the possibility of corrosive attack is greatest by accelerating the oxygen depletion reaction with a low chromate concentration.

In fact, in a water slurry of coal without any chromate control, applicant has observed a corrosion rate of 30–70 mils per year, with severe pitting of the pipeline; and with chromate control according to the invention, a corrosion rate of 1–2 mils per year with low pitting was observed.

OBJECTS OF THE INVENTION

It is in general the broad object of the present invention to provide a method for the controlled release of chromate into a slurry of coal and water so that an effective but materially reduced concentration of the chromate is present during the entire period of transport of the coal slurry through the steel pipeline.

It is in general the broad object of the present invention to provide an improved chromate corrosion control for transport of solid slurries, such as a coal slurry, through a steel pipeline.

DESCRIPTION OF THE PREFERRED EMBODIMENT

In order to demonstrate the effectiveness of the invention, tests were performed in which equal amounts by weight of sodium dichromate and melted wax were mixed together and the homogeneous mass allowed to solidify. The mixture was then formed in a Parr pellet press into pellets ¼-inch in diameter and 3/16-inch thick.

A number of pellets were stirred with a coal slurry containing 50% solids by weight in a sealed vessel. Sufficient pellets were added such that the total addition of $Cr^{+6}$ ion was 50 parts per million based on the water phase.

Figure 1:
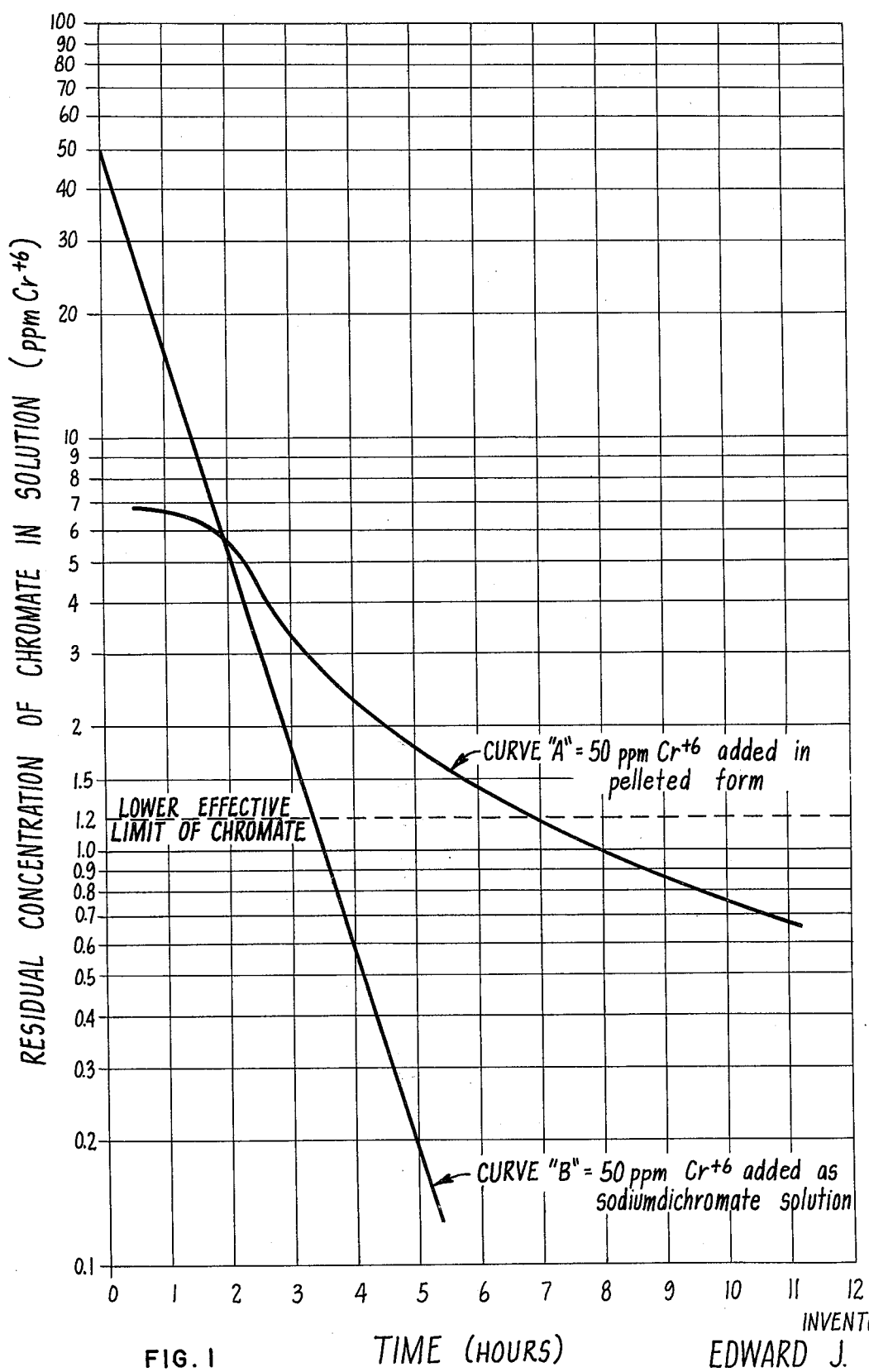
FIG. 1 is a diagram showing the residual concentration of chromate solution in parts per million as against time based in one case upon the addition of 50 parts per million of $Cr^{+6}$ added as sodium chromate solution and in the other of 50 parts per million of $Cr^{+6}$ as sodium dichromate embedded in wax pellets.

For comparison purposes, a similar system was set up in which 50 ppm of $Cr^{+6}$ was added in the form of sodium dichromate solution. Referring to FIG. 1 of the drawing, it will be seen that in the system wherein wax pellets were used, the concentration of $Cr^{+6}$ ion at no time exceeded 7 parts per million, with the resulting effect that the depletion of chromate by the coal was slow. On the other hand, the system in which the sodium dichromate solution was used showed high initial $Cr^{+6}$ ion concentration and consequent rapid chromate depletion. Thus, it was demonstrated that the pelleted chromate system significantly extended the effective life of the sodium dichromate. At the same time, by having a small concentration of the hexavalent chromate present, the oxygen was depleted more rapidly.

Figure 2:
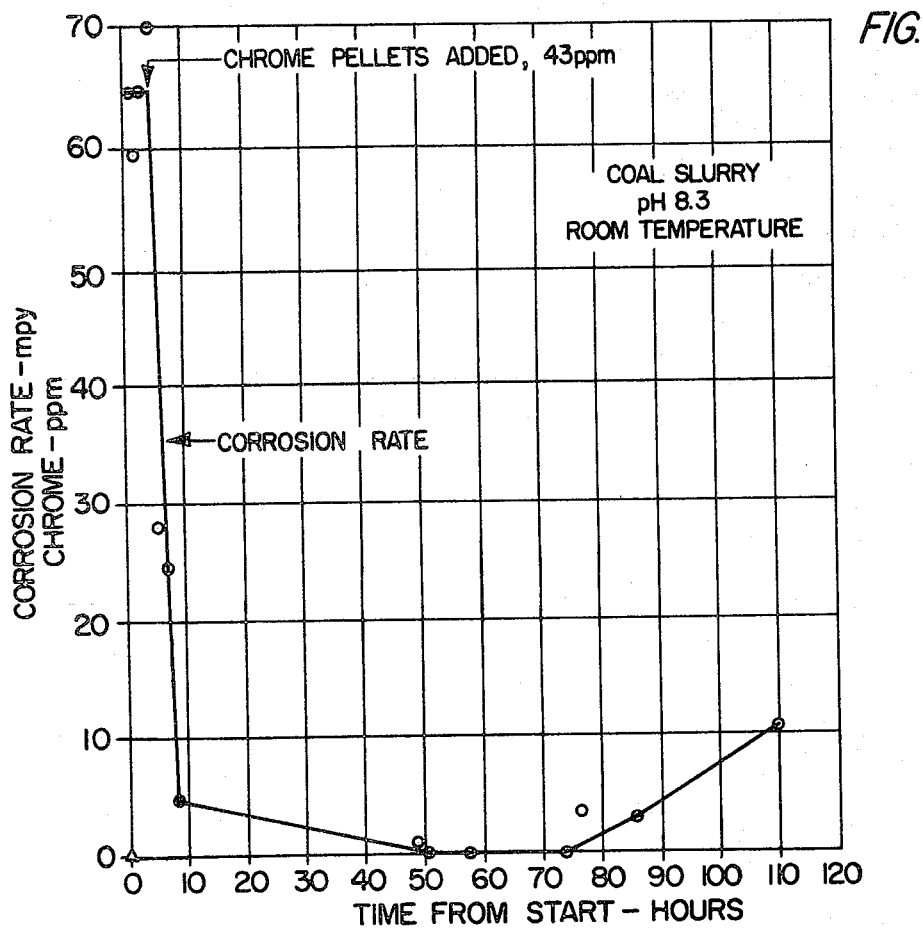
FIG. 2 shows corrosion rate as a function of time, for a coal slurry, wherein the chromate is added in pelleted form.

In another test, pellets were made by mixing equal parts by weight of sodium dichromate, melted paraffin wax and gypsum, allowing the mixture to solidify and forming the solidified mixture into pellets ¼-inch in diameter and 3/16-inch thick in a Parr pellet press. The pellets were then added to a coal slurry at room temperature and having a pH of 8.3, and in an amount equivalent to 43 parts per million chromate. As shown in FIG. 2, the initial corrosion rate was about 65 mils per year. As soon as the chromate is released from the pellets, however, the corrosion rate drops to about 4 mils per year and actually falls below 4 mils per year from about 10 hours up to about 85 hours. The, as the chromate is used up, the corrosion rate begins to increase. By providing the chromate in pellet form and in the amount shown, the length of time during which corrosion protection is obtained is significantly greater than in accordance with prior art methods. Further, the chromate concentration remains about constant for approximately 40 hours, rather than being initially very high and then decreasing rapidly as in prior art methods.

Corrosion rates were measured using a bench scale laboratory test, and the chromate concentrations were measured colorimetrically from small samples drawn from a corrosion test pot.

The proposed system is not limited to the materials referred to above. Any of the commonly available water soluble chromate salts may be used, such as those of lithium, sodium, potassium, cesium, calcium and magnesium. In addition, numerous materials may be employed as a carrier to retard the release of the soluble inhibitor such as the chromate to the system. Also, the size of the pellet or particle is not restricted to the one used above, but may be adjusted to suit the particular system. The water soluble inhibitor diffuses gradually from the carrier particles into the continuous water phase. This release may be assisted to some extent by the attrition of the carrier particles by the solid particles in the slurry.

As an inhibitor for inclusion in the carrier, one can utilize any inhibitor which is soluble in the continuous phases, e.g. water or an oil, and which reacts with the discrete phase on the pipe wall at a rate which decreases the inhibitor concentration.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. The method of inhibiting corrosion in a steel pipeline used to transport an aqueous slurry of solid coal particles, consisting essentially of placing a chromate salt having a low water solubility in an inert carrier and forming the carrier and chromate salt mixture into pellets, placing the pellets into a pipeline containing an aqueous slurry of solid coal particles, thereby permitting the slow release of the chromate from the pellets as the pellets are transported with the slurry such that the concentration of hexavalent chromium ion in the slurry at no time exceeds about 7 ppm, thus resulting in a high rate of oxygen depletion and a low rate of consumption of chromate by the solid particles in the slurry.

2. The method as in claim 1, including the steps of forming the pellets from a mixture of equal parts by weight of sodium dichromate, melted paraffin wax and gypsum, allowing the mixture to solidify, and then forming the solidified mixture into pellets having a diameter of ¼-inch and a thickness of 3/16-inch.

* * * * *